A. B. HELLER.
SANITARY FLYTRAP.
APPLICATION FILED APR. 8, 1921.
1,392,156.
Patented Sept. 27, 1921.
2 SHEETS—SHEET 1.
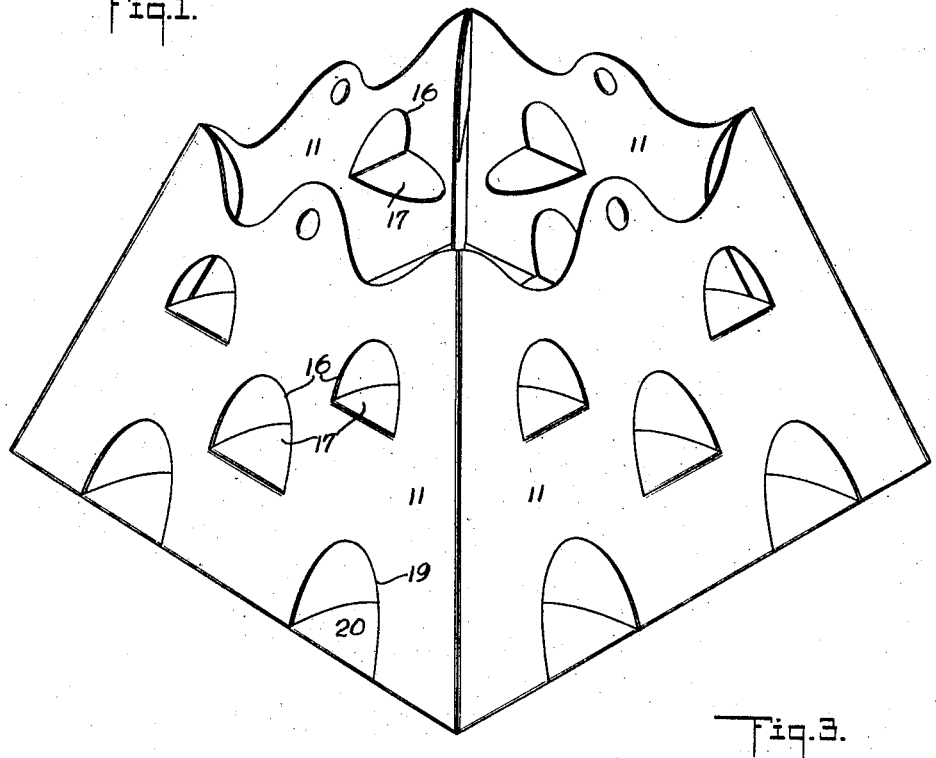
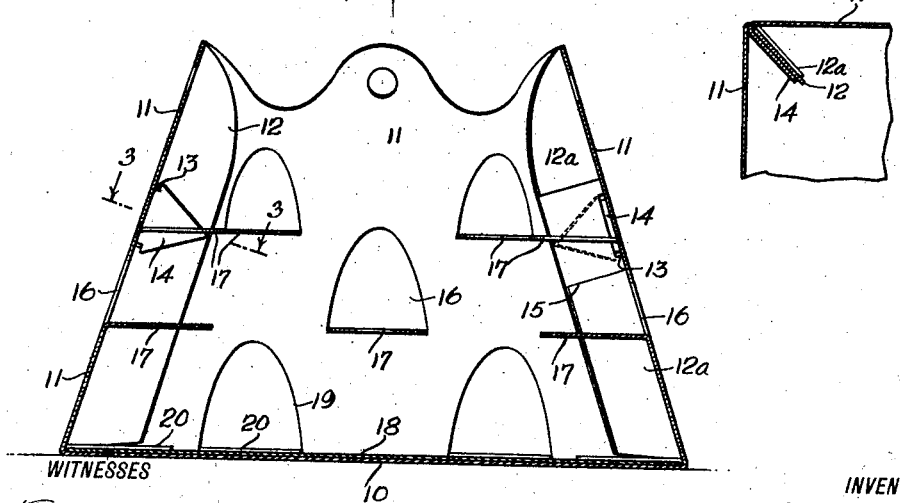
WITNESSES
INVENTOR
A.B. HELLER
BY
ATTORNEYS

A. B. HELLER.
SANITARY FLYTRAP.
APPLICATION FILED APR. 8, 1921.

1,392,156.

Patented Sept. 27, 1921.
2 SHEETS—SHEET 2.

WITNESSES
Frederick Diehl.

INVENTOR
A. B. HELLER
BY
ATTORNEYS

UNITED STATES PATENT OFFICE.

ALFRED B. HELLER, OF HAMBURG, PENNSYLVANIA.

SANITARY FLYTRAP.

1,392,156.  Specification of Letters Patent.  Patented Sept. 27, 1921.

Application filed April 8, 1921. Serial No. 459,620.

*To all whom it may concern:*

Be it known that I, ALFRED B. HELLER, a citizen of the United States, and a resident of Hamburg, in the county of Berks and State of Pennsylvania, have invented a new and improved Sanitary Flytrap, of which the following is a description.

My invention relates to a fly trap and the general object of the invention is to provide a structure adapted to be set up from a flat form to present a bottom and sides: together with means on said structure to retain fly paper supported on the bottom of the structure.

An important object of the invention also is to provide a sanitary trap which may be burned with the flies thereon and to provide a sanitary trap of a character that the fly paper cannot possibly contact with surrounding objects to soil the same.

More specifically, the invention has for an object to provide novel locking means for the set-up sides as well as a novel arrangement of inlet openings and ledges for the flies.

The above and other objects as will appear are attained by the novel structure hereinafter described and claimed.

Reference is to be had to the accompanying drawings forming a part of this specification, it being understood that the drawings are merely illustrative of one example of the invention.

Figure 1 is a perspective view of a fly trap formed in accordance with my invention and in set-up form;

Fig. 2 is a vertical section;

Fig. 3 is a detail in horizontal section on the line 3—3, Fig. 2;

Figure 4:
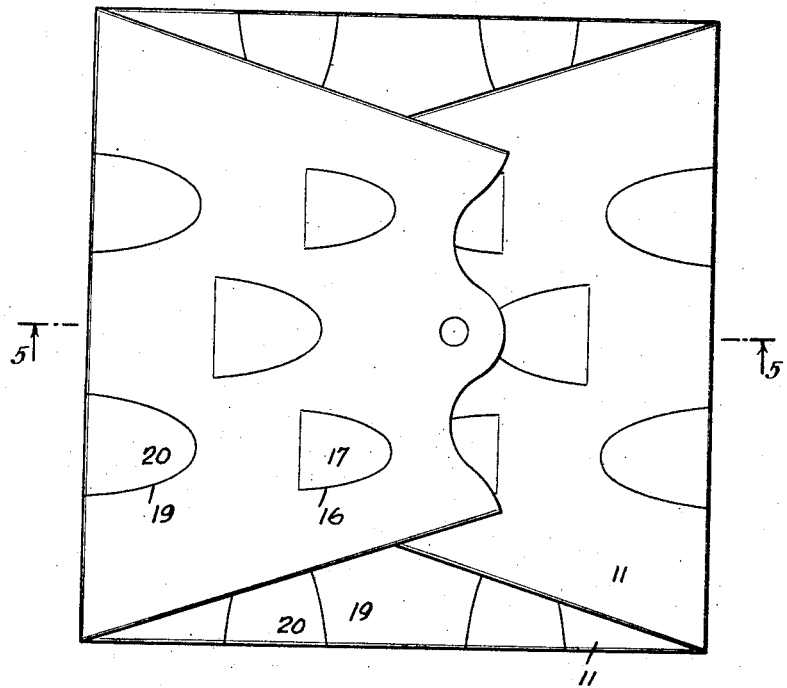
Fig. 4 is a plan view of the trap in knocked-down form.
Figure 5:
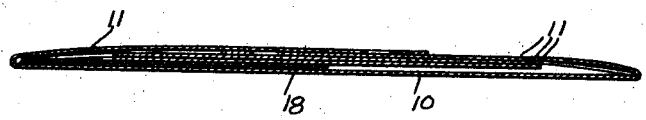
Fig. 5 is a vertical section on line 5—5, Fig. 4.

In forming a fly trap in accordance with my invention I produce from suitable sheet material, preferably stiff paper, a blank having a central portion and four foldable elements so that the central portion constitutes a bottom 10 and the foldable elements may be set up in the form of four sides 11. On the side edges of each side 11 are flanges 12 adapted to be folded to extend laterally inward at the corners, said flanges having slots 13 therein through which a locking tongue 14, preferably arrow-shaped, may be entered, said locking tongue being formed on the adjacent side 11. Thus, the flanges and tongues will constitute integral portions of the sides and the adjacent flanges 12, 12$^a$ will lie against each other. The flanges 12$^a$ at one edge of each side has a cut-out 15 at the center. At each cut-out the locking tongue 14 is located, said tongue being formed from the cut-out material and like the flange 12$^a$ being integral at its base with the adjacent edge of the adjacent side 11. The arrangement is such that the trap when set up is of pyramidal box-like form, the sides overhanging at an angle.

Windows or openings 16 are provided in the sides 11 for the entrance of the flies and to produce said windows the material is cut leaving tongues 17 integral at their base with the sides, the tongues being adapted to be bent laterally inward out of the planes of the sides to form ledges for the flies at the windows 16.

While the bottom 18 can be utilized to support a saucer or other receptacle for liquid for the flies the preferred form of my invention includes fly paper 14 adapted to lie on the bottom 10. I provide retaining means for the paper and at the same time produce windows 19 adjacent to the bottom, the material of the windows being cut in the form of tongues 20 adapted to be bent laterally inward out of the planes of the sides 11 to overlie the paper 18 to retain the same in place. Moreover, the tongues 20 form non-sticky areas leading inwardly from the areas over which the flies may pass to the fly paper to the exposed sticky area thereof. Initially, the paper 18 is folded on itself as shown in Fig. 4 with the sticky material at the interior, the paper thus presenting upper and lower folds. The lower fold is secured by adhesive material or other means to the bottom 10. When the trap is to be set up for use the top fold of the paper 18 is folded into the plane of the bottom fold so that the sheet of fly paper lies in the same plane flat on the bottom 10. The bottom 10 or the opposed back of the fly paper may have adhesive material which may be wetted to cause the fly paper to adhere to the bottom. In any case the retaining members 20 when folded into the fly paper may hold the same in place.

With the above arrangement the fly paper and dead flies will not be conspicuous and indeed will scarcely be visible through the openings 19. Also, the fly paper is fully protected against contact with adjacent objects and the trap may be blown over by a breeze without displacing the fly paper.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A fly trap having a bottom and sides of sheet material, said sides being foldable into the plane of the botom or set-up to give the trap a box-like form, said sides being formed with flanges along their side edges and bent to extend laterally inward at the interior of the trap at the corners and with adjacent flanges lying against each other, certain of said flanges having portions in the form of locking tongues and the adjacent flanges having slots through which said tongues may extend.

2. A fly trap including a bottom, sides having members integral therewith and bendable inwardly out of the planes of the sides to form ledges for the flies within the trap above the bottom thereof, there being openings in the sides at said ledges.

ALFRED B. HELLER.